US008613056B2

(12) United States Patent
Kumar et al.

(10) Patent No.: US 8,613,056 B2
(45) Date of Patent: Dec. 17, 2013

(54) EXTENSIBLE AUTHENTICATION AND AUTHORIZATION OF IDENTITIES IN AN APPLICATION MESSAGE ON A NETWORK DEVICE

(75) Inventors: Sandeep Kumar, Cupertino, CA (US); Vinod K. Dashora, Fremont, CA (US); Subramanian N. Iyer, Santa Clara, CA (US); Yuquan Jiang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1809 days.

(21) Appl. No.: 11/441,594

(22) Filed: May 26, 2006

(65) Prior Publication Data
US 2007/0289005 A1 Dec. 13, 2007

(51) Int. Cl.
H04L 29/06 (2006.01)

(52) U.S. Cl.
USPC .................................. 726/5; 726/13

(58) Field of Classification Search
USPC ............... 713/151–162; 726/5, 11–15, 17–21
See application file for complete search history.

(56) References Cited

U.S. PATENT DOCUMENTS

| 6,226,788 | B1 | 5/2001 | Schoening et al. |
| 6,505,228 | B1 | 1/2003 | Schoening et al. |
| 7,054,924 | B1 | 5/2006 | Harvey et al. |
| 7,516,198 | B1 | 4/2009 | Appala et al. |
| 2004/0128498 | A1* | 7/2004 | Lang et al. ..................... 713/153 |
| 2006/0092861 | A1 | 5/2006 | Corday et al. |
| 2006/0106941 | A1 | 5/2006 | Singhal et al. |
| 2006/0123226 | A1 | 6/2006 | Kumar et al. |
| 2006/0123467 | A1 | 6/2006 | Kumar et al. |
| 2006/0136555 | A1* | 6/2006 | Patrick et al. ................. 709/203 |
| 2006/0143295 | A1 | 6/2006 | Costa-Requena et al. |
| 2006/0156388 | A1 | 7/2006 | Stirbu et al. |
| 2006/0168253 | A1 | 7/2006 | Baba et al. |
| 2006/0168648 | A1 | 7/2006 | Vank et al. |
| 2006/0185001 | A1 | 8/2006 | Stieglitz et al. |
| 2006/0200458 | A1 | 9/2006 | Sankar |
| 2006/0288404 | A1 | 12/2006 | Kirshnan et al. |
| 2007/0088707 | A1 | 4/2007 | Durgin et al. |
| 2007/0289005 | A1 | 12/2007 | Kumar et al. |

OTHER PUBLICATIONS

Snoeren et al., "Mesh-Based Content Routing using XML," AM, 2001, 14 pages.
Mascolo et al., "XMILE: An XML based Approach for Programming Networks," dated 2001, 8 pages.
Cisco AON Programming Guide, AON Release 1.1, dated Oct. 2005, 316 pages.

* cited by examiner

Primary Examiner — Edward Zee
Assistant Examiner — Chi Nguy
(74) Attorney, Agent, or Firm — Hickman Palermo Truong Becker Bingham Wong LLP

(57) ABSTRACT

User credentials are validated within a network infrastructure element such as a packet data router or switch. The network element has authentication and authorization logic for receiving one or more packets representing an input application message logically associated with OSI network model Layer 5 or above; extracting user credentials from the one or more packets; authenticating an identity associated with the user credentials; authorizing privileges to the identity; and forwarding the application message to an intended destination if the identity is successfully authenticated and/or authorized. The authentication and authorization logic in the network element can invoke extension authentication and authorization methods that may be provisioned after the network element is deployed in a networked system.

30 Claims, 8 Drawing Sheets

EXTENSIBLE AUTHENTICATION AND AUTHORIZATION OF IDENTITIES IN AN APPLICATION MESSAGE ON A NETWORK DEVICE

PRIORITY CLAIM

This application claims the benefit under 35 U.S.C. 119(e) of prior provisional application 60/692,715, filed Jun. 21, 2005, the entire contents of which are hereby incorporated by reference for all purposes as if fully set forth herein.

FIELD OF THE INVENTION

The present invention generally relates to data processing techniques performed within network infrastructure elements such as routers and switches. The invention relates more specifically to techniques for authenticating and authorizing identities in an application message on a network device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Software applications operating in a network environment exchange application messages. An "application message," or simply "message", as used herein, refers to a message emitted or consumed by a software element that is logically located at Layer 5 or higher of the OSI reference model. Messages may be contained in more than one data frame, packet or segment. For simplicity, the term "packet" is used to refer to a unit of organization under an internetworking protocol, such as data frame, packet or segment, at Layer 2, 3 or 4 of the OSI reference model.

Application end points such as clients and servers in a distributed system communicating over a network often need to authenticate users' credentials presented in an application message and, if the authentication succeeds, authorize the users for specific privileges for using system or application resources. Authentication and authorization usually is done by application end points. Application end points, or simply applications, are required to perform authentication and authorization operations relating to messages received. Under this approach, logic extracting user credentials from application messages is part of application processes. However, to perform the extraction, applications need to know specific details of application message formats such as where user credentials are stored.

Additionally, authentication or authorization logic often communicates with one or more authentication or authorization service providers or data stores. Thus, applications often need to know specific details of service providers or data stores such as where and how the user credentials extracted from messages can be compared with trusted user credentials kept by the service providers or data stores. To complicate the matter, some service providers or data stores may not be based on industry standards in providing the authentication or authorization related services.

Applications' needs for authentication and authorization may change. For example, service provider may change. An application may need to support LDAP, instead of Kerberos for authentication. Or an application may need to access a data store, instead of a service provider.

Furthermore, formats of application messages may change with respect to user credentials. User credentials may be specified in an application protocol header (say HTTP header) or SOAP header. Also they can come as a part of application message body in an application specific format, or in a payload.

Generally, in past approaches, in order to handle any of these changes, the implementation of the application has to be changed. This is time-consuming and requires significant resources in programming labor.

Further, in typical past approaches, the number of points at which authentication and authorization are performed is proportional to the number of application endpoints. This is a waste of application processing resources.

Also, in typical past approaches, authentication and authorization by an application can only authenticate and authorize based on user credentials present in an application message. Since the application typically is ignorant of what user credentials may present below OSI layer 5, authentication and authorization for such user credentials typically has to be performed elsewhere. An example of such user credentials is an SSL certificate. This results in a fragmented processing, waste of resources and potential inconsistent outcome.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
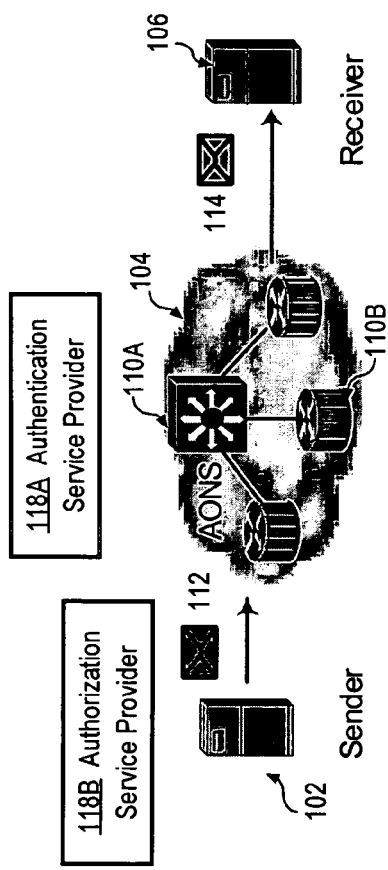
FIG. 1A is a block diagram that illustrates an overview of a network arrangement that can be used to implement an embodiment.

An apparatus and method for extensible authentication and authorization of identities present in an application message on a network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
 2.0 Structural and Functional Description
 3.0 AONS Implementation Examples
  3.1 AONS General Overview
  3.2 Multi-Blade Architecture
  3.3 AONS Blade Message Processing Framework
  3.4 Extension Package Implementation
 4.0 Implementation Mechanisms—Hardware Overview
 5.0 Extensions and Alternatives 1.0 General Overview The needs identified in the foregoing Background, and other needs and objects that will become apparent for the following description, are achieved in the present invention, which comprises, in one aspect, a data processing apparatus, comprising a plurality of network interfaces that are coupled to a data network for receiving one or more packets therefrom and sending one or more packets thereto; one or more processors; a switching system coupled to the one or more processors and packet forwarding logic, wherein the switching system and packet forwarding logic are configured to receive packets on a first network interface, determine a second network interface on which to send the packets, and to send the packets on the second network interface; a computer-readable storage medium having stored thereon a plurality of authentication methods and a policy that associates the authentication methods with respective message types; authentication and authorization logic comprising one or more stored sequences of instructions which, when executed by the one or more processors, cause the one or more processors to perform: receiving one or more packets representing an application message; determining a particular type of the application message; identifying one or more user credential elements in the one or more packets; selecting, based on the policy and the particular type of the application message, a particular authentication method, and validating the application message using the one or more user credential elements and the particular authentication method.

In one feature of this aspect, the one or more packets comprise one or more protocol headers, and wherein a subset of the one or more user credential elements is located in the one or more protocol headers. In another feature of this aspect, the application message comprises an application message header, and wherein a subset of the one or more user credential elements is located in the application message header.

In a further feature, the authentication and authorization logic further comprises sequences of instructions which, when executed by the processor, cause the processor to perform extracting an application message payload from the application message, and identifying a subset of the one or more user credential elements in the application message payload.

In still another feature, the authentication and authorization logic further comprises sequences of instructions which, when executed by the processor, cause the processor to perform forwarding an outgoing message associated with the application message to a destination.

In yet another feature, the computer-readable storage medium further comprises a plurality of user credential location definitions that specify locations of user credentials for various types of application messages, and wherein identifying one or more user credential elements includes selecting a particular user credential location definition and performing the identifying based on the particular user credential location definition.

In a further feature, the apparatus comprises any of a packet data router and a packet data switch in a packet-switched network.

In another aspect, the authentication and authorization logic further comprises sequences of instructions which, when executed by the processor, cause the processor to perform authenticating an identity associated with the one or more user credential elements. In one feature of this aspect, the authentication and authorization logic further comprises sequences of instructions which, when executed by the processor, cause the processor to perform executing the particular authentication method by sending the user credentials to an authentication service provider and requesting authentication of the user credentials.

In another feature, the authentication and authorization logic further comprises sequences of instructions which, when executed by the processor, cause the processor to perform authorizing one or more privileges associated with the identity. In one version of this feature, the computer-readable medium has stored thereon a plurality of authorization methods, wherein the policy associates the authorization methods with the respective message types, and wherein the authentication and authorization logic further comprises sequences of instructions which, when executed by the processor, cause the processor to perform selecting, based on the policy and the particular type of the application message, a particular authorization method, and executing the particular authorization method by sending the identity to an authorization service provider and requesting authorization of the one or more privileges associated with the identity.

In other aspects, the invention encompasses a machine-implemented method and a computer-readable medium configured to carry out the foregoing steps.

2.0 Structural and Functional Overview

Figure 1B:
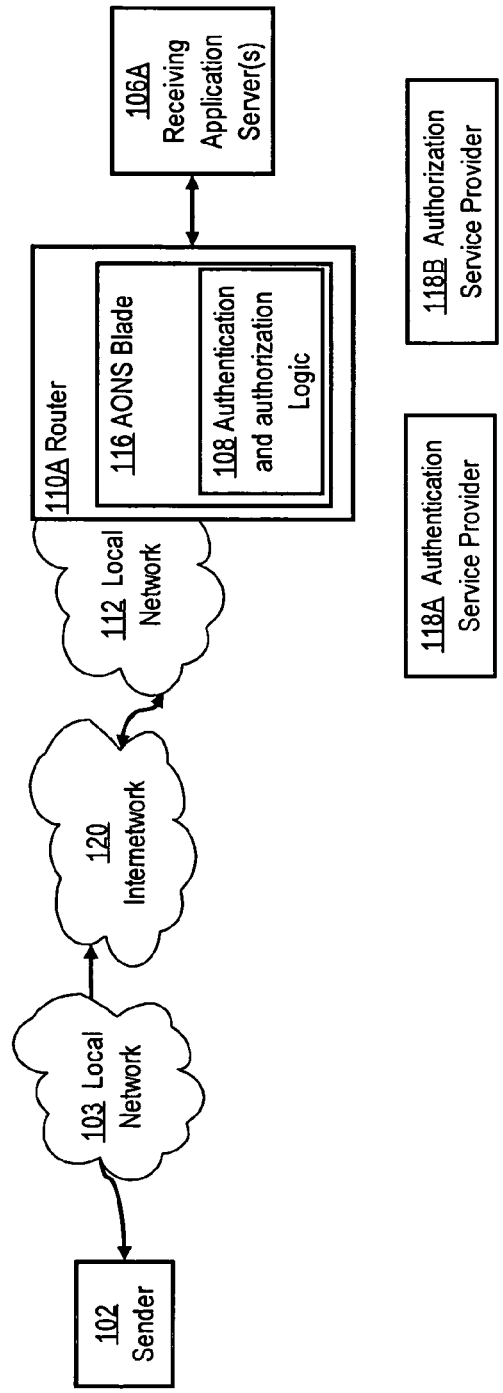
FIG. 1B is a block diagram showing authentication and authorization logic in a network infrastructure element such as a router, in one embodiment.

FIG. 1A is a block diagram of network elements involved in an extensible authentication approach according to an embodiment. FIG. 1B is a block diagram showing authentication and authorization logic in a network infrastructure element such as a router, in one embodiment.

Referring first to FIG. 1A, a sender 102 is coupled through a network 104 to a receiver 106. The network 104 comprises one or more network infrastructure elements 110, such as routers or switches. Each of the network elements 110 comprises one or more blades, bladelets, or other software elements, alone or in combination with hardware or firmware elements, that implement inspection, at various OSI layers, of packets received in association with an application message and related authentication and authorization functions as described herein.

A commercial embodiment of network elements 110A may comprise routers or switches from Cisco Systems, Inc., San Jose, Calif., with blades having Application-Oriented Networking Services (AONS) capabilities. In some embodiments, network elements 110A are termed "AONS nodes" or "AONS endpoints." Other network elements 110B may be non-AONS nodes. Further, network elements 110A need not use Cisco AONS technology; the network elements can comprise routers or switches that comprise other internal elements to perform extensible authentication and authorization functions as described herein. Thus, the use of AONS in an embodiment is not required, and all references herein to AONS elements are provided merely to illustrate a clear example, and not as limitations.

In an embodiment, the validation of an application message by network elements 110A involves accessing an authentication service provider 118A and an authorization service provider 118B.

The authentication service provider 118A may implement either standard-based or proprietary technology-based authentication services. Similarly, the authorization service 118B may implement either standard-based or proprietary technology-based authorization services. Examples of the standard-based authentication or authorization service providers include those based on LDAP, Kerberos, X509, or SAML. In some embodiments, authentication or authorization service providers such as 118A or 118B may comprise database access routines and a database storing user credential and privilege information. Furthermore, in some embodiments, an authentication service provider and an authorization service provider can comprise a single authentication and authorization server.

As seen in FIG. 1B, sender 102 is coupled through a local network 103 to an internetwork 120 that is coupled to another local network 112. Either of the local networks 103 and 112 may have network elements 110 that implement the techniques herein. As an example, router 110A in local network 112 is equipped with an AONS blade 116, available from Cisco Systems, Inc. San Jose, Calif. The AONS blade 116 comprises one or more bladelets that form authentication and authorization logic 108. In certain embodiments all the network elements 110 include authentication and authorization logic 108, which comprises one or more computer programs, programmatic objects, or other software elements that implement the functions described herein.

Generally, the authentication and authorization logic 108 identifies user credentials in an application message. Examples of user credentials are peer SSL certificates, HTTP basic authentication scheme and parameters, or HTTP negotiate authentication data from message headers, and user/password token, SAML token, SPNEGO token or X509 token from a message body.

The authentication and authorization logic 108 performs authentication and authorization based on the user credentials that were identified. If the authentication and authorization of the application message succeeds, the application message is processed according to a policy. For example, the message is forwarded to a receiving application server 106A. Thus, in the arrangement of FIG. 1B, router 110 is proximate to the receiving application servers 106A, and can perform authentication and authorization for all the application servers. For example, sender 102, and other senders at different locations in networks 103, 120, might send different requests to different instances of applications on different application servers 106A. The authentication and authorization logic 108 can perform application message authentication and authorization for all such requests, relieving the application instances and application servers 106A from the processing burden of authentication and authorization for each request.

Alternatively, if router 110 is located in local network 103, the router can perform application message authentication and authorization when sender 102 emits messages and before the messages reach the application servers 106A. In all such cases, the data processing efficiency of the application servers 106A is greatly improved because router 110 is responsible for message authentication and authorization, and the application servers are responsible only for performing substantive application functions.

When an application message authentication and authorization operation is performed in a network device, the operation can be performed on a device that is closer to the application that is sending the message or the application that is receiving the message. As a result, if there are multiple instances of an application running, possibly on different hosts, then a single device through which all the messages are passing can perform the needed authentication and authorization. Accordingly, efficiency of the overall network is improved.

In some embodiments, extensible authentication and authorization is provided by using a user configurable policy. In this approach, the user configurable policy specifies how an incoming message should be authenticated or authorized.

In one embodiment, through a user interface, a user is enabled in the user configurable policy to define a plurality of message types and associations each of which associates between a particular authentication method with a corresponding message type. In one embodiment, the policy is created at design time in advance of message processing, based on known characteristics of incoming messages and outgoing messages. The policy associates authentication methods or authorization methods with respective message types. The policy can also associate user credential location definitions that specify locations of user credentials with respective message types. For example, the policy can be created using AONS Design Studio (ADS), and downloaded to an AONS node via AONS Management Console (AMC). An ADS designer can select an authentication method for a message type among LDAP and Kerberos SPNEGO, X509 Certificate based authentication methods and extension authentication methods provided by extension packages, as further explained herein. Similarly, the ADS designer can select an authorization method for the message type among LDAP Group-, SAML Assertion-, and Rule-based methods and extension authorization methods provided by extension packages. During runtime, the authentication and authorization logic 108 retrieves the policy and an incoming message. The authentication and authorization logic 108 determines the application message type, identifies user credentials in the message, validates the incoming message by applying associated authentication and authorization methods, and, if successful, directs other elements of the network element 110A to process the message according to a success policy, e.g., to forward the message on a path to a receiving application server 106A.

Figure 2:
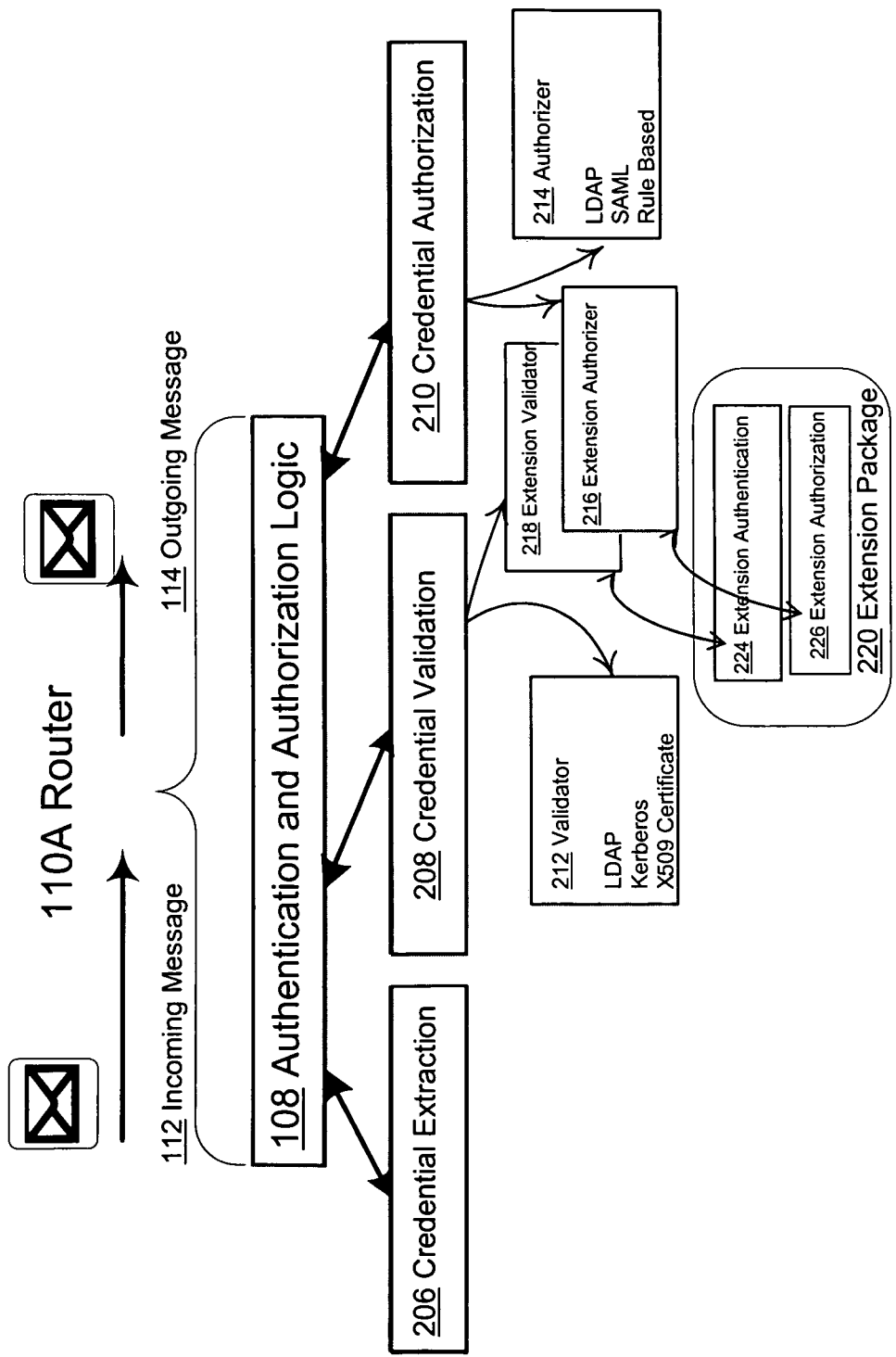
FIG. 2 is a block diagram of software elements that may be used to implement the authentication and authorization logic, in one embodiment.

FIG. 2 is a block diagram of software elements that can be used to implement the authentication and authorization logic 108 in an AONS blade 116 of a router, in one embodiment. The authentication and authorization logic 108 comprises logic for credential extraction 206, credential validation 208, and credential authorization 210. In one embodiment, the logic can take the form of one or more AONS bladelets. For example, credential extraction 206, credential validation 208, and credential authorization 210 can be implemented as "identify", "authenticate", and "authorize" bladelets, respectively.

Upon receiving an incoming message 112 on any network interface of the router, the credential extraction 206 inspects the message. Credential extraction 206 has access to user credential location definitions for various application message types. In a preferred embodiment, credential extraction 206 makes use of existing components in the network infrastructure element 110A that allow extraction or identification in packets associated with an application message of fields in various OSI layers. The search of user credential fields may be conducted on headers, data, or payloads at standard locations or non-standard locations, and additionally or alternatively, using name-value pairs or regular expressions. In one embodiment, credential extraction 206 identifies user credentials or a subset thereof in locations specified by standards. In another embodiment, the credential extraction identifies the user credentials or a subset thereof based on user credential location definitions for the message type. In yet another embodiment, credential extraction 206 identifies the user credentials from both locations identified by the standards and by the user credential location definitions.

Credential validation 208 authenticates an identity associated with the user credentials. In a preferred embodiment, credential validation 208 comprises a validator 212 for built-in authentication methods and an extension validator 218 for non built-in authentication methods, which may be developed before or after the network infrastructure element 110A is deployed. For the built-in authentication methods, a user or policy specifies which one is to be used for a particular application message type. For example, the authenticate bladelet embodiment of credential validation 208 in an AONS bladelet has built-in authentication methods based on LDAP, Kerberos SPNEGO or X509 Certificate.

The extension validator 218 can be configured to invoke an extension authentication 224 in extension packages 220 for authentication methods that do not have built-in support. The extension packages 220 for non built-in authentication methods may be deployed before or after the installation of the router 110A in a network. In a preferred embodiment, the authentication and authorization logic 108 does not require the presence of a particular extension package 220 unless a corresponding non built-in authentication method is to be supported. However, when a non built-in authentication method is to be supported at runtime, the extension validator 218 is configured accordingly and the extension authentication 224 is provisioned to the network infrastructure element 110A.

An extension authentication 224 can be developed in a programming language that makes use of application programming interfaces (APIs) to support a particular authentication method. For example, an extension authentication can be developed in JAVA that makes use of SiteMinder JAVA Agent APIs, available from Computer Associates, Inc. ("CA"), to support the SiteMinder Authentication. In a preferred embodiment, the configuration that directs the extension validator 218 to use the extension authentication thus developed can be specified in AONS Design Studio. Both the configuration and the extension authentication can be provisioned to the network infrastructure element 110A to form an extension package 220 before its use by the extension validator 218 at runtime. In a preferred embodiment, the configuration and the extension package can be pre-packaged into a downloadable file in AONS Design Studio, and subsequently downloaded to an AONS node.

When the extension authentication 224 is invoked, it is made available all the required and optional parameters by the authentication and authorization logic 108. The extension authentication 224 reads configuration parameters relevant to accessing an authentication service provider or a database that stores necessary information for authentication. In some embodiments, the parameter list, values, and access routines for parameters are configured for a particular authentication method and authentication service provider in authentication and authorization logic 108. In a preferred embodiment, the parameter list, values, and access routines for parameters can be pre-packaged into a downloadable file in AONS Design Studio, and subsequently downloaded to an AONS node. For example, as a part of extension configuration in AMC, a user configures necessary and optional parameters including those required for connecting to an authentication service provider such as SiteMinder Policy Server from CA.

At runtime, the extension authentication 224 uses the parameters, performs the authentication method, and returns the result to its caller.

The credential authorization 210 can be invoked to authorize privileges to an identity associated with the user credentials. In a preferred embodiment, the credential authorization 210 comprises an authorizer 214 for built-in authorization methods and an extension authorizer 216 for non built-in authorization methods, which may be developed later. For the built-in authentication methods, a user or policy specifies which one is to be used for a particular application message type. For example, the authorize bladelet embodiment of credential authorization 210 in an AONS bladelet has built-in authorization methods based on LDAP Groups, SAML Assertions or rules.

The extension authorizer 216 can be configured to invoke an extension authorization 226 in extension packages 220 for authorization methods that do not have built-in support. The extension packages 220 for non built-in authorization methods may be deployed before or after the installation of the router 110A in a network. In a preferred embodiment, the authentication and authorization logic 108 does not require a particular extension package 220 unless a corresponding non built-in authorization method is to be supported. However, when a non built-in authorization method is to be supported at runtime, the extension authorizer 216 is configured accordingly and the extension authorization 226 is transferred to the network infrastructure element 110A.

An extension authorization 226 can be developed in a programming language that makes use of application programming interfaces (hereinafter APIs) to support a particular authorization method. For example, an extension authorization can be developed in JAVA that makes use of SiteMinder JAVA Agent APIs to support SiteMinder Authorization. In a preferred embodiment, the configuration that directs the extension authorizer 216 to use the extension authorization thus developed can be specified in AONS Design Studio. Both the configuration and the extension authorization can be provisioned to the network infrastructure element 110A to form an extension package 220 before its use by the extension authorizer 216 at runtime. In a preferred embodiment, the configuration and the extension package can be pre-packaged into a downloadable file in AONS Design Studio, and subsequently downloaded to an AONS node.

When the extension authorization 226 is invoked, it is made available all the required and optional parameters by the authentication and authorization logic 108. The extension authorization 226 reads configuration parameters relevant to accessing an authorization service provider or a database that stores necessary information for authorization. In some embodiments, the parameter list, values, and access routines for parameters are configured for a particular authorization method and authorization service provider in authentication and authorization logic 108. In a preferred embodiment, the parameter list, values, and access routines for parameters can be pre-packaged into a downloadable file in AONS Design Studio, and subsequently downloaded to an AONS node. For example, as a part of extension configuration in AMC, a user configures necessary and optional parameters including those required for connecting to an authorization service provider such as SiteMinder Policy Server from CA.

At runtime, the extension authorization 226 uses the parameters, performs the authorization method, and returns the result.

If the authentication and authorization tasks complete successfully, the authentication and authorization logic 108 directs the application message to a receiving application server 106A.

Thus, the extension validator 218, extension authorizer 216, extension package 220, which may include extension authentication 224 or extension authorization 226, represent an extensibility mechanism for the authentication and authorization logic 108.

There may be multiple extension packages 220 deployed in a network infrastructure element 110A. In various embodiments, an extension package 220 may provide support for authentication only, or for authorization only, or both. Thus, the SiteMinder extension package, discussed above, which supports both authentication and authorization, is described solely to present a clear example and not as a limitation. Furthermore, an extension package 220 may provide support for authentication and/or authorization using service providers other than SiteMinder as discussed. In one embodiment, authentication and/or authorization service is provided by Tivoli Access Manager from International Business Machine Corp., Armonk, N.Y. Thus, network elements 110A need not depend on a particular authentication and/or authorization service provider such as SiteMinder. Any authentication and/or authorization provider that is capable of performing authentication and authorization service upon a request by an extension package described herein is within the scope of the present invention. Thus, the use of SiteMinder in an embodiment is not required, and all references herein to SiteMinder are provided merely to illustrate a clear example, and not as limitations.

In an embodiment, support for a new authentication or authorization method by the network infrastructure element 110A can be disabled or enabled without requiring changes in implementation or re-building of the network infrastructure element code. In this embodiment, a user can easily enable or disable a method for business reasons, such as a change in a business partner relationship involving an authentication or authorization service provider. Also, a supplier for network infrastructure element 110A may need to enable or disable support for a specific method based on a licensing agreement or possibly different product bundling needs.

Figure 3:
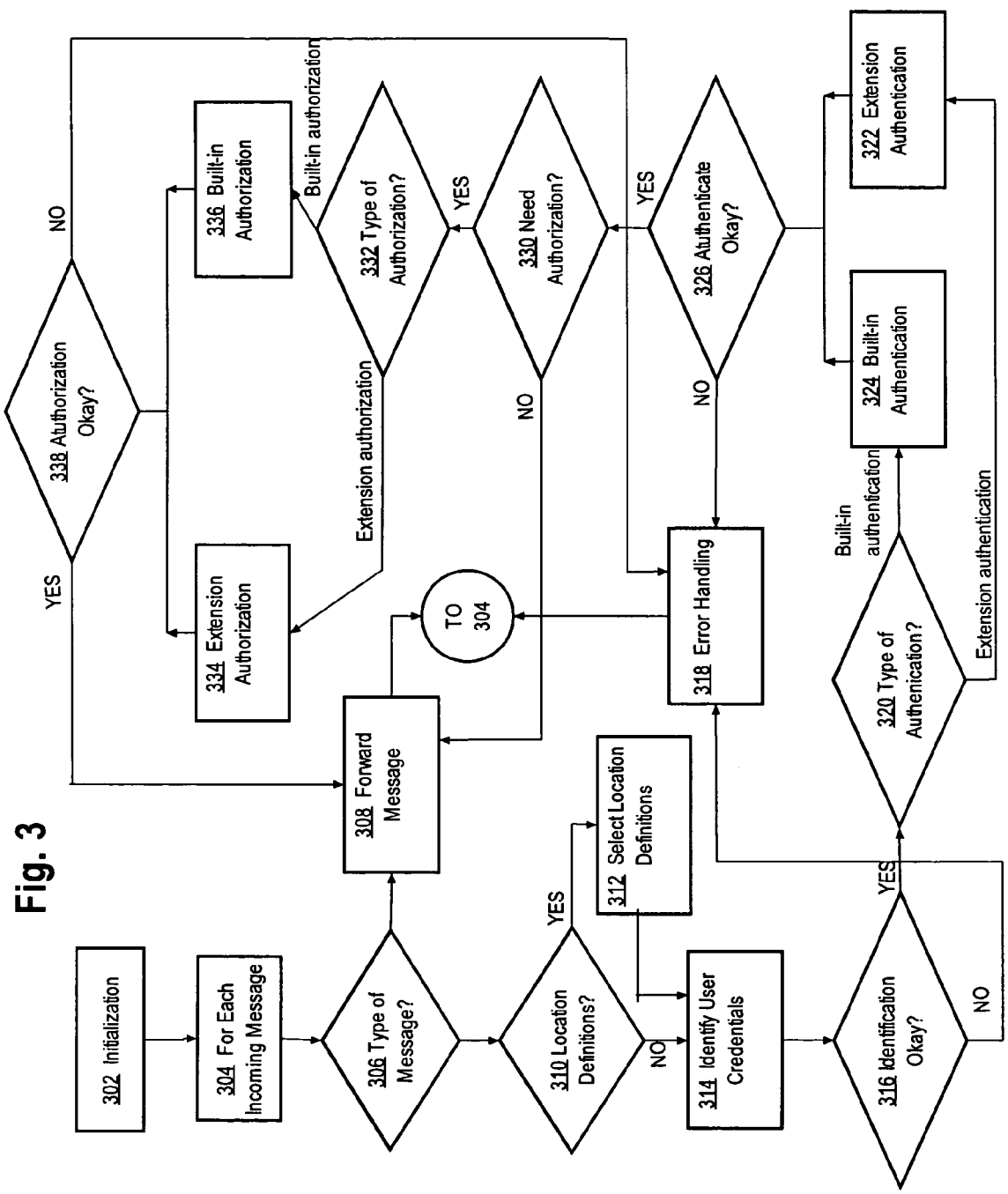
FIG. 3 is a flow diagram of one embodiment of a process of application message authentication and authorization.

FIG. 3 is a flow diagram of one embodiment of a process of application message authentication and authorization. In step 302, initialization is performed, for example, by the authentication and authorization logic 108. In one embodiment, initialization comprises reading configuration parameters, including a message type list, authentication method list, authorization method list, user credentials location definitions, and associations between a message type and its respective authentication and authorization methods and user credential location definitions.

At step 304, for each incoming message received from a data network coupled to the network infrastructure element 110A, certain other steps are performed. In step 306, the type of the application message is determined by the network infrastructure element 110A. The type of an application message may be determined on a number of attributes carried by the application message or the underlying packets associated with the application message. Attributes capable of identifying application message types include endpoints' addresses or ports, universal resource locations (URL) at HTTP level, special fields in the message, or regular expression patterns. Additionally or alternatively, attributes capable of identifying application include any standard or proprietary tokens embedded in a message or underlying packet that identifies a particular type for an application message. For example, a string constant denoting an application name may be embedded in an application message in a proprietary manner to identify a particular application type.

If the incoming message is not a type that has been configured for authentication and authorization, in step 308, the authentication and authorization logic passes the message to logic in the network infrastructure element 110A for further processing such as forwarding the message towards its intended destination. If the incoming message is a type of an application message that has been configured for authentication and authorization, in step 310, the credential extraction 206 determines whether user credential location definitions should be consulted. For a plurality of application message types, the user credentials may be located in standard locations. In step 314, the credential extraction 206 identifies the user credentials in those standard locations. For some application message types, on the other hand, the user credentials may be located in a proprietary locations or non-standard locations. In step 312, a user credential location is selected for definitions corresponding to one such application message type as appropriate and, in step 314, the user credentials in those locations are identified.

If step 316 determines that the identification of user credential has failed, then error handling is invoked at step 318. The error handling may include logging the error and suppressing the erroneous message from being further forwarded to its intended destination. If the identification of use credential is successful as determined at step 316, then the credential validation 208 is invoked, and at step 320, the process determines whether a built-in or extension authentication method is associated with the message type. If the incoming message is of a type that associates with an extension authentication method, then at step 322, processing is passed to the extension validator 218, which handles invocation of the extension authentication method provided by extension authentication 224 in extension package 220, and which passes all the parameters necessary or optional for the invocation of the extension authentication method. If the incoming message is of a type that associates with a built-in authentication method, at step 324, then processing is passed to the validator 212 for executing the specified built-in authentication method.

At step 326, the credential validation 208 determines the result of the authentication method, whether it is built-in or extension. If the authentication method has failed to authenticate the identity, processing is passed to step 318 for error handling. If the user identity associated with user credentials has been successfully authenticated, then credential authorization 210 is invoked, and at step 330 determines whether an authorization method has been specified for the message type. If not, the authentication and authorization logic passes the message at step 308 to logic in the network infrastructure element 110A for further processing such as forwarding the message towards its intended destination.

If the incoming message is of a type that associates with an extension authorization method, at step 334, processing is passed to the extension authorizer 216, which handles invocation of the extension authorization method provided by extension authorization 226 in extension package 220, and which passes all the parameters necessary or optional for the invocation of the extension authorization method. If the incoming message is of a type that associates with a built-in authorization method, at step 336, processing is passed to the authorizer 214 for executing the specified built-in authorization method.

At step 338, the credential authorization 210 determines the result of the authorization method, whether it is built-in or extension. If the authorization has failed to authorize privileges required for the application message type for the identity for whatever reason, processing is passed to step 318 for error handling. Else if the user identity associated with user credentials has been successfully authorized for the privileges required for the application message type, the authentication and authorization logic passes the message at step 308 to a logic in the network infrastructure element 110A for further processing such as forwarding the message towards its intended destination.

3.0 AONS Implementation Examples 3.1 AONS General Overview

In an embodiment, AONS comprises a set of software modules hosted on a network infrastructure element, such as a router or switch, that can identify application messages from packet flows, perform operations on the applications messages, and perform application functions on behalf of applications, clients and servers. Examples of operations and functions include format transformation; payload changes based on policy; performing load-balancing decisions; sending messages to monitoring stations; and creating log entries, notifications and alerts according to rules. AONS complements existing networking technologies by providing a greater degree of awareness of what information is flowing within the network and helping users to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AONS integrates with network-layer support to provide a more holistic approach to information flow and management, mapping required features at the application layer into low-level networking features implemented by routers, switches, firewalls and other networking systems. In an embodiment, a data processing unit ("blade") in a router or switch hosts and executes one or more AONS software modules ("bladelets") to implement the functions herein.

3.2 Multi-Blade Architecture

According to one embodiment, an AONS blade in a router or a switch performs the actions discussed herein.

Figure 4:
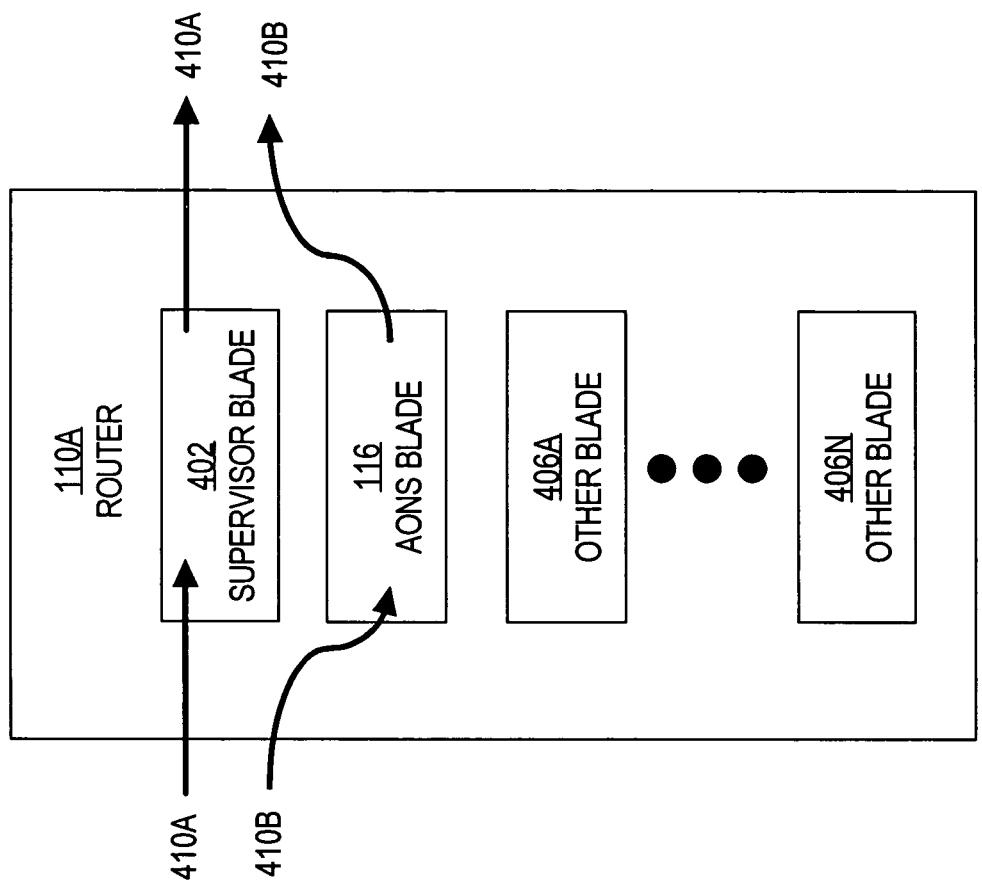
FIG. 4 is a block diagram that illustrates one embodiment of a router in which a supervisor blade directs some packet flows to an AONS blade and/or other blades.

FIG. 4 is a block diagram that illustrates one embodiment of a router 110A in which a supervisor blade 402 directs some of packet flows 410A-B to an AONS blade and/or other blades 406A-N. Router 110A comprises supervisor blade 402, AONS blade 116, and other blades 406A-N. Each of blades 402, 116, and 406A-N is a single circuit board populated with components such as processors, memory, and network connections that are usually found on multiple boards. Blades 402, 116, and 406A-N are designed to be addable to and removable from router 110A. The functionality of router 110A is determined by the functionality of the blades therein. Adding blades to router 110A can augment the functionality of router 110A, but router 110A can provide a lesser degree of functionality with fewer blades at a lesser cost if desired. One or more of the blades may be optional.

Router 110A receives packet flows such as packet flows 410A-B. More specifically, packet flows 410A-B received by router 110A are received by supervisor blade 402. Supervisor blade 402 may comprise a forwarding engine and/or a route processor such as those commercially available from Cisco Systems, Inc.

In one embodiment, supervisor blade 402 classifies packet flows 410A-B based on one or more parameters contained in the packets of those packet flows. If the parameters match specified parameters, then supervisor blade 402 sends the packets to a specified one of AONS blade 116 and/or other blades 406A-N. Alternatively, if the parameters do not match any specified parameters, then supervisor blade 402 performs routing functions relative to the particular packet and forwards the particular packet on toward the particular packet's destination.

For example, supervisor blade 402 may determine that packets in packet flow 410B match specified parameters. Consequently, supervisor blade 402 may send packets in packet flow 410B to AONS blade 116. Supervisor blade 402 may receive packets back from AONS blade 116 and/or other blades 406A-N and send the packets on to the next hop in a network path that leads to those packets' destination. For another example, supervisor blade 402 may determine that packets in packet flow 410A do not match any specified parameters. Consequently, without sending any packets in packet flow 410A to AONS blade 116 or other blades 406A-N, supervisor blade 402 may send packets in packet flow 410A on to the next hop in a network path that leads to those packets' destination.

AONS blade 116 and other blades 406A-N receive packets from supervisor blade 402, perform operations relative to the packets, and return the packets to supervisor blade 402. Supervisor blade 402 may send packets to and receive packets from multiple blades before sending those packets out of router 110A. For example, supervisor blade 402 may send a particular group of packets to other blade 406A. Other blade 406A may perform firewall functions relative to the packets and send the packets back to supervisor blade 402. Supervisor blade 402 may receive the packet from other blade 406A and send the packets to AONS blade 116. AONS blade 116 may perform one or more message payload-based operations relative to the packets and send the packets back to supervisor blade 402.

3.3 AONS Blade Message Processing Framework

Figure 5:
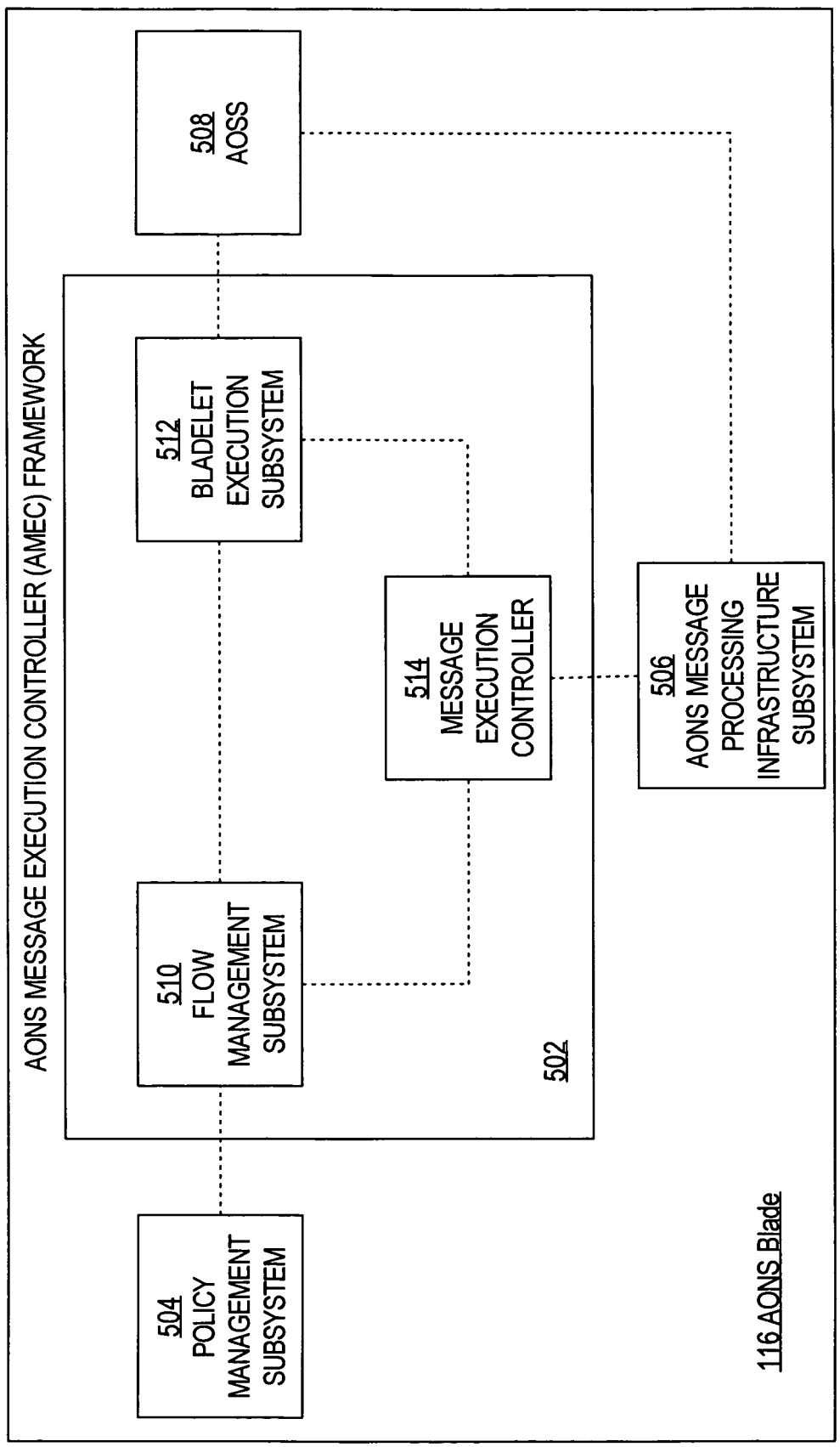
FIG. 5 is a diagram that illustrates message-processing modules within an AONS node.

FIG. 5 is a diagram that illustrates message-processing modules within an AONS blade 116. AONS blade 116 comprises an AONS message execution controller (AMEC) framework 502, a policy management subsystem 504, an AONS message processing infrastructure subsystem 506, and an AOSS 508. AMEC framework 502 comprises a flow management subsystem 510, a bladelet execution subsystem 512, and a message execution controller 514. Policy management subsystem 504 communicates with flow management subsystem 510. AOSS 508 communicates with bladelet execution subsystem 512 and AONS message processing infrastructure subsystem 506. AONS message processing infrastructure subsystem 506 communicates with message execution controller 514. Flow management subsystem 510, bladelet execution subsystem, and message execution controller 514 all communicate with each other.

Figure 6:
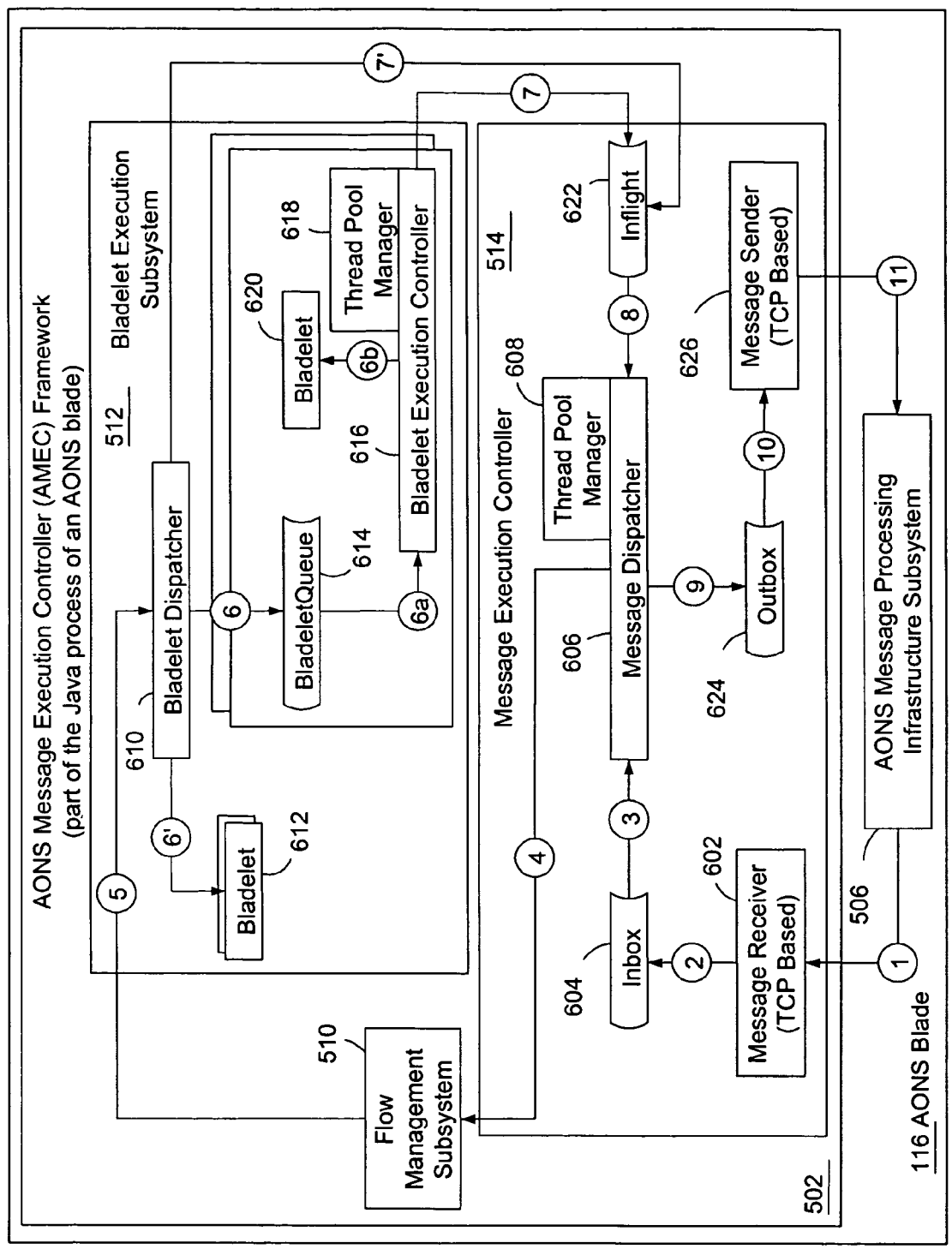
FIG. 6 is a diagram that illustrates message processing within AONS node.

FIG. 6 is a diagram that illustrates message processing within AONS blade 116. AMEC framework 602 is an event-based multi-threaded mechanism to maximize throughput while minimizing latency for messages in the AONS blade. According to one embodiment, received packets are re-directed, TCP termination is performed, SSL termination is performed if needed, Layer 5 protocol adapter and access method processing is performed (using access methods such as HTTP, SMTP, FTP, JMS/MQ, JMS/RV, JDBC, etc.), AONS messages (normalized message format for internal AONS processing) are formed, messages are queued, messages are dequeued based on processing thread availability, a flow (or rule) is selected, the selected flow is executed, the message is forwarded to the message's destination, and for request/response-based semantics, responses are handled via connection/session state maintained within AMEC framework 602.

In one embodiment, executing the flow comprises executing each step (i.e., bladelet/action) of the flow. If a bladelet is to be run within a separate context, then AMEC framework 602 may enqueue into bladelet-specific queues, and, based on thread availability, dequeue appropriate bladelet states from each bladelet queue.

3.4 Extension Package Implementation

In one embodiment, the following tools are provided for creating extension package for authentication and authorization in an AONS node: a custom bladelet software development kit (hereinafter "Custom Bladelet SDK"), a design studio, or ADS, and an admin tool, or AMC, all commercially available from Cisco Systems, Inc. A designer uses Cisco Custom Bladelet SDK, java editor, or other third party tools to write Java code that will provide bladelet functionality. ADS is a visual tool for designing flows and applying message classification and mapping policies. AMC is a web-based interface to perform all administration and configuration functions.

Figure 7:
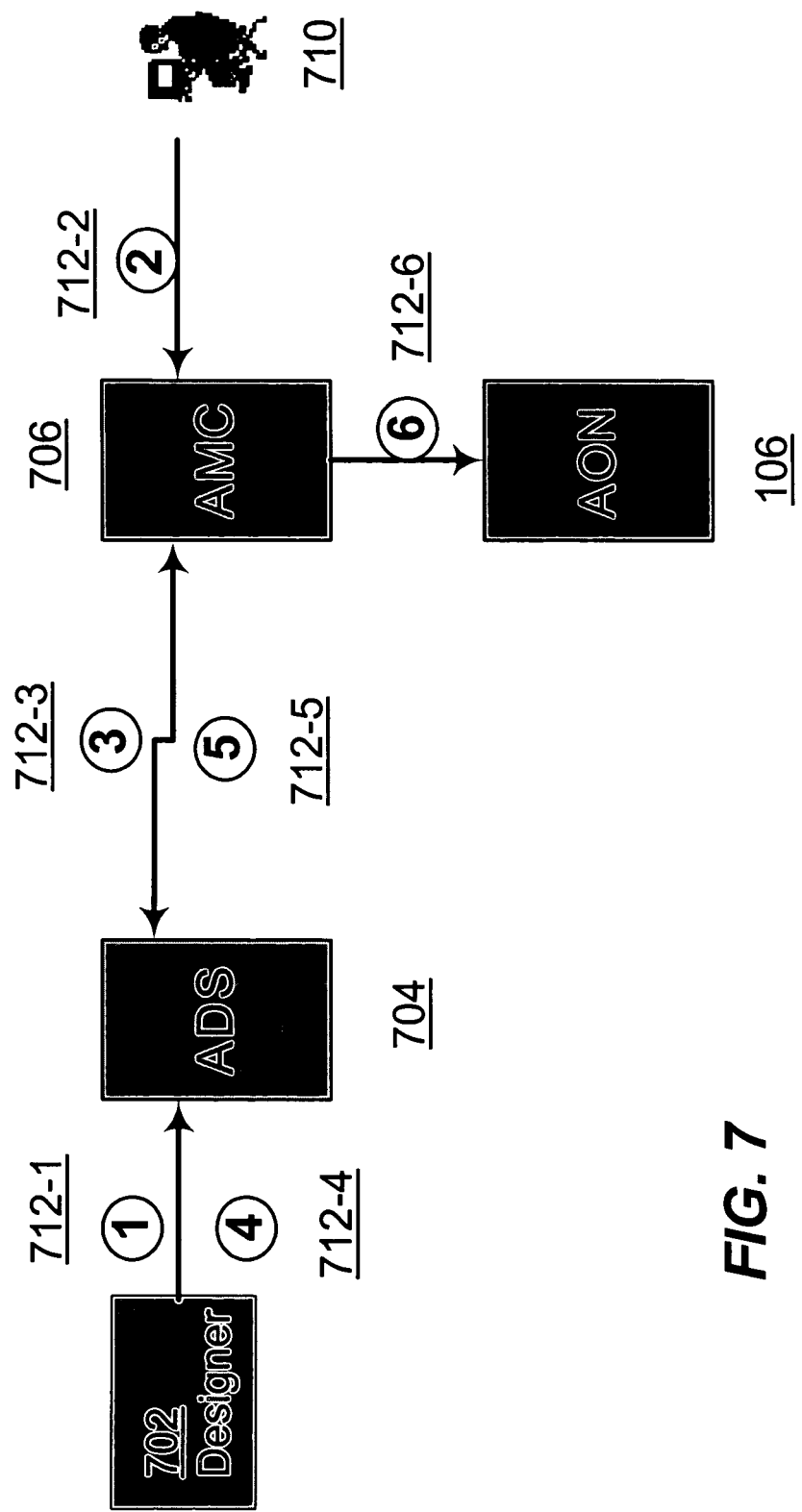
FIG. 7 is a flow diagram of how an authentication and/or authentication package is created and provisioned to an AONS blade, in one embodiment.

FIG. 7 is a flow diagram of how an authentication and/or authentication package is created and provisioned to an AONS blade, in one embodiment. In one embodiment, designer 702 develops new custom bladelet classes to support an extension authentication/authorization method by extending bladelet classes provided in Cisco Custom Bladelet SDK and implementing an authentication and authorization APIs. Table 1 identifies example JAVA classes and methods that can be used in an implementation.

TABLE 1

| | AUTHENTICATION AND AUTHORIZATION API | |
|---|---|---|
| Method | Description | Return Type |
| | AAHandlerFactory<br>This interface defines an Authentication/Authorization Handler Factory object. This is implemented by an Authentication and Authorization Extension that intends to extend authentication and authorization function in AON. Class name in Authentication and Authorization Extension Package that implements this interface is specified in Authentication and Authorization Extension Meta Info. | |
| createHandler | This method creates an AAHandler object. This method must be implemented by extensions in a thread safe manner. | AAHandler |
| | AAHandler<br>This interface defines methods for authentication and authorization function. Objects that implement this interface are created by AAHandlerFactory. The authentication and authorization logic 108 invokes AAHandlerFactory and creates AAHandler objects. These objects are then used to handle authenticate and authorize requests made by respective bladelets when corresponding extension is selected in the bladelet. | |
| Authenticate | This method performs authentication. It takes a collection of parameters (name/value pairs) that defines an execution context. It contains all the configuration parameters specified in extension configuration in the bladelet. | AuthenticationResult |
| Authorize | This method performs authorization. It takes a collection of parameters (name/value pairs) that defines an execution context. It contains all the configuration parameters from extension configuration in authorization bladelet. | AuthorizationResult |
| | AuthenticationResult<br>This class defines result of authentication operation. It contains result code and a collection of attribute values provided by the authenticator. | |
| getResultCode | This method returns the result code of the authentication result. If the result code is AUTHC_SUCCESS it indicates authentication success and if it is AUTHC_FAILURE it indicates authentication failure. | Integer |
| getAttributes | This method returns a collection of attribute value pairs returned as a result of authentication. This can provides attributes which are specific to extension implementation and may or may not be used by AON. It can also return attributes that AON may request the extension to provide if the operation results in authentication success.<br>One example of this could be an authenticator may supply a mapped identity of the user being authenticated. Another example could be an option if the result of authentication can be cached and if so for how long a duration they can be cached.<br>These attribute names/values that AON can handle will be documented as required. | HashMap |

TABLE 1-continued

AUTHENTICATION AND AUTHORIZATION API

| Method | Description | Return Type |
| --- | --- | --- |
| | AuthorizationResult<br>This class defines result of authorization operation. It contains result code and a collection of values provided by the authorizer. | |
| getResultCode | This method returns the result code of the authorization result. If the result code is AUTHZ_PERMIT it indicates access requested is permitted and if it is AUTHZ_DENIED it indicates access requested is denied. | Integer |
| getAttributes | This method returns a collection of attribute value pairs returned as a result of authorization.<br>An example of an attribute value can be if operation failed the reason for failure, or if the authorization is denied then explanation of access denial.<br>These attribute names/values that AON can handle will be documented as required. | HashMap |

At step 712-1, the designer 702 interacts with ADS 704 and creates an authentication/authorization extension package. As a part of creating the package, the designer 702 provides a number of artifacts. First, the designer 702 provides one or more JAVA *.jar files implementing an extended authentication method and necessary libraries. For example, in case of a SiteMinder extension, the designer 702 provides the jar files implementing a SiteMinder Java Agent functionality and a number of library files referenced directly or indirectly by the SiteMinder Java Agent such as smjavaagentapi.jar, smjavasdk2.jar, libsmagentapi.so and libsmjavaagentapi.so for SiteMinder Release 5.5, commercially available from CA.

Additionally, the designer 702 provides bladelet extension info XML files for the custom bladelets, using bladelet extension info schema defined in Cisco Custom Bladelet SDK. Table 2 shows an example bladelet extension info XML file for SiteMinder authentication that can be used in an implementation.

TABLE 2

AN EXAMPLE BLADELET EXTENSION INFO XML FILE

```
<plugin displayNameKey="aaext.siteminder"
  id="com.cisco.aons.security.aaext.SMAAExtPlugin"
  version="1.0"
  provider-name="Cisco System, Inc."
  pluginClass="com.cisco.aons.security.aaext.SMAAExtension"
  bundle="com.cisco.aons.security.aaext.SMAAExtProperties">
  <extension point="Authentication:1.ext_config_type"
      extClass="com.cisco.aons.security.aaext.SMAAHandlerFactory"
      extValidationClass="com.cisco.aons.security.aaext.validator.-
      SMAAValidator"
      displayNameKey="aaext.siteminder"
      id="SMAuthentication">
    <designSpec>
      <extParams>
        <extParam id="1">
          <configuration-group name="ConfigurationType"
            key="cg.authnscheme"
            value="extension" valueKey="cg.authnscheme.extension"
            type="radio">
            <configuration-subgroup>
```

TABLE 2-continued

AN EXAMPLE BLADELET EXTENSION INFO XML FILE

```
              <parameter-group name="ExtensionSubjectSource"
                key="cg.authnscheme.extension.pg.source">
                <parameter name="ExtensionSubject"
                  designName="extension.source.input"
                  key="cg.authnscheme.extension.pg.source.p.input"
                  type="AONSSubject" allowUserInput="false"/>
              </parameter-group>
              <parameter-group name="ExtensionConfiguration"
                key="cg.authnscheme.extension.pg.configuration">
                <parameter name="ExtensionResource"
                  designName="extension.configuration.resource"
                  key="cg.authnscheme.extension.pg.extensionconfiguration.p.-
                  resource"
                  type="string" allowUserInput="true"
                  allowVarBinding="true"/>
                <parameter name="Profile"
                  designName="extension.configuration.profile"
                  key="cg.authnscheme.extension.pg.configuration.p.profile"
                  type="policy" allowUserInput="false"
                  allowVarBinding="false"
                  domain="com.cisco.aons.policies.security.-
                  NeteSiteMinderInfo">
                </parameter>
              </parameter-group>
            </configuration-subgroup>
          </extParam>
        </extParams>
      </designSpec>
    </extension>
</plugin>
```

The designer 702 further provides parameters that are needed to perform the extension authentication and authorization method. The parameters may be defined by an attribute domain. Table 3 shows an example attribute domain for SiteMinder authentication that can be used in an implementation.

TABLE 3

EXAMPLE ATTRIBUTE DOMAIN

| No | Parameter/Property | Description |
|----|---|---|
| 1 | Access Server | Specifies IP Address of SiteMinder Policy Server. |
| 2 | Agent Name | Name of Web Agent configured in the Policy Server. |
| 3 | Agent Secret | Password or secret for the agent. This is needed to connect to the agent object in Policy Server. |
| 4 | Minimum no of connection | Agent API object is initialized with minimum no of connections. It creates these connections to SM Policy Server when it is initialized. |
| 5 | Maximum no of connection | Indicates the maximum no of connections Agent API will create. |
| 6 | Connection Step | Indicates the number by which connections are increased if Agent API needs to increase number of connections to SM Policy Server. Total number of connections does not exceed the value specified in 5. |
| 7 | Connection Timeout in seconds | This value is used as a timeout when any authentication or authorization call is made on Agent API object. |
| 8 | Authentication Port | Indicates the value of authentication port configured on SM Policy Server. SM 5.5 Policy Server can configure a specific port value to use for authentication service. For SM 6.0 default can be used. |
| 9 | Authorization Port | Indicates the value of authorization port configured on SM Policy Server. SM 5.5 Policy Server can configure a specific port value to use for authorization service. For SM 6.0 default can be used. |
| 10 | Accounting Port | Indicates the value of accounting port configured on SM Policy Server. SM 5.5 Policy Server can configure a specific port value to use for accounting service. For SM 6.0 default can be used. |
| 11 | Failover SM Policy Server Address | Specifies IP Address of Failover SM Policy Server to use. |

Note:
Properties in rows 4, 5, 6, 7, 8, 9, 10 are provided for Failover SM Policy Server also.

In one embodiment, the authentication/authorization extension package created with the above artifacts is saved as a bar file on a disk.

At step 712-2, an administrator 710 uploads and registers the authentication/authorization extension package to AMC 706. Once loaded and registered, the authentication/authorization extension package is available for use in ADS.

At step 712-3, the designer 702 causes ADS 704 to synchronize with AMC 706 to retrieve the authentication/authorization extension package which has been enabled and made available by the AMC uploading and registering step 712-2.

At step 712-4, the designer 702 continues his or her designing tasks of defining message flows between bladelets, message types, user credential location definitions, and any associations of user credential location definitions with the message types.

At step 712-5, the administrator 710 causes AMC 706 to synchronize with ADS 704 to retrieve the flows, message types, user credential location definitions, and associations defined in step 712-4.

At step 712-6, the administrator 710 deploys to an AON blade 106 the extension package, and a policy comprising of the message flows, message types, user credential location definitions and associations of the user credential location definitions with the message types, and enable the AON blade 106 to use the authentication/authorization method available in the extension package.

4.0 Implementation Mechanisms—Hardware Overview

Figure 8:
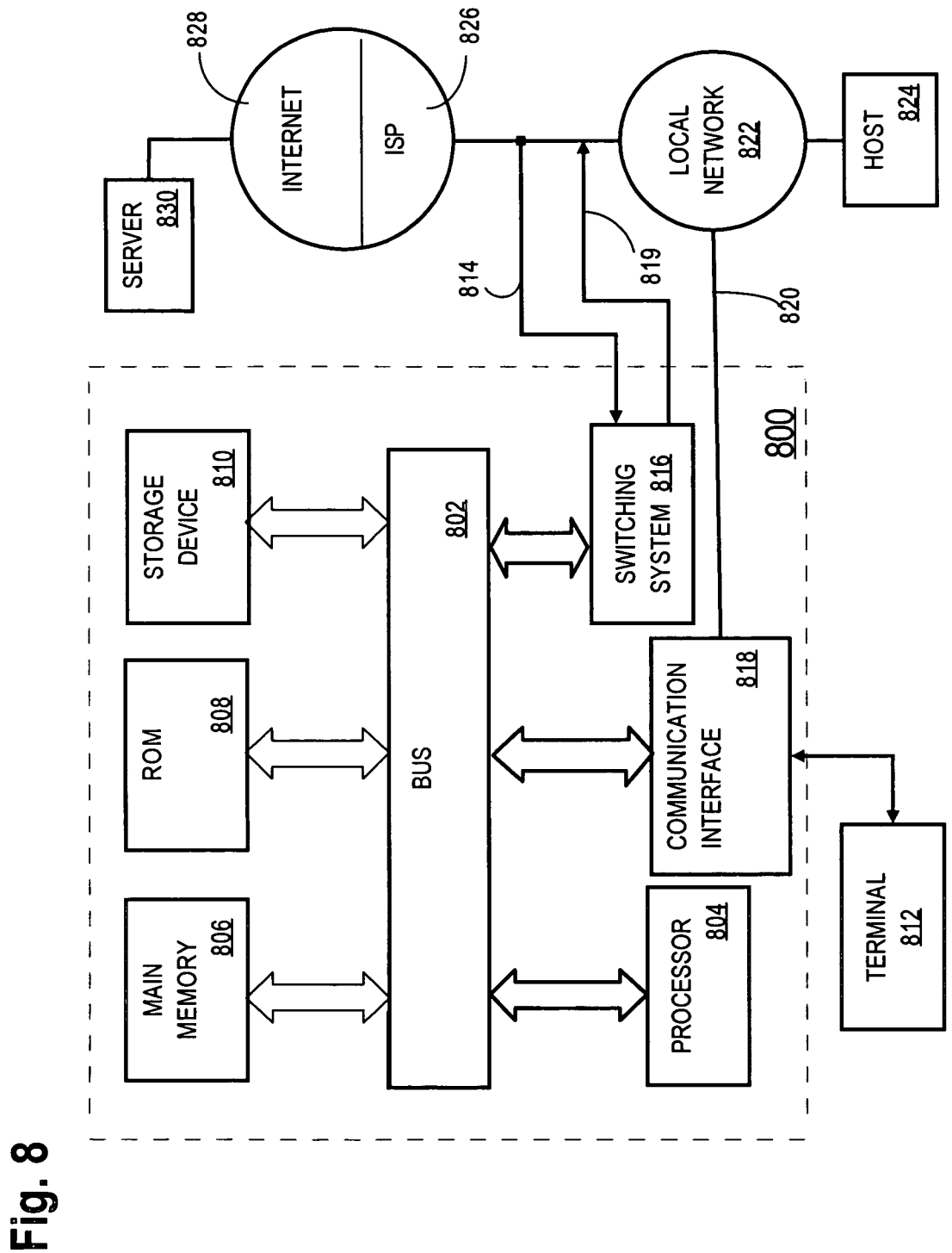
FIG. 8 is a block diagram that illustrates a computer system upon which an embodiment may be implemented.

FIG. 8 is a block diagram that illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for extensible authentication and authorization in a network infrastructure element. According to one embodiment of the invention, extensible authentication and authorization in a network infrastructure element is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for extensible authentication and authorization in a network infrastructure element as described herein.

The received code may be executed by processor 804 as it is received, and/or stored in storage device 810, or other non-volatile storage for later execution. In this manner, computer system 800 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The preceding description has disclosed an approach for performing extensible authentication and authorization in a network device. The approach herein provides an improved authentication and authorization approach because a network device is more efficient in performing extended authentication or authorization methods, which may be deployed even after the network device has been installed.

The approach herein has numerous benefits over prior approaches. For example, the approach reduces the number of processing locations at which a message is authenticated or authorized. Application endpoints are not required to perform authentication or authorization. As a result, application resources can focus on core application functions, rather than implementing authentication and authorization logic in a fragmented manner.

The approach herein is useful for any network gear vendor that needs mechanisms to provide authentication and authorization capability in a networking device to enable better security.

What is claimed is:

1. A data processing apparatus, comprising:
a plurality of network interfaces that are coupled to a data network for receiving one or more packets therefrom and sending one or more packets thereto;
one or more processors;
a switching system coupled to the one or more processors and packet forwarding logic, wherein the switching system and packet forwarding logic are configured to receive packets on a first network interface, determine a second network interface on which to send the packets, and to send the packets on the second network interface;
a non-transitory computer-readable storage medium having stored thereon a plurality of authentication methods and a policy that associates the authentication methods with respective message types, and a plurality of user credential location definitions that specify locations of user credentials for various types of application messages;
authentication and authorization logic comprising one or more stored sequences of instructions which, when executed by the one or more processors, cause the one or more processors to perform:
receiving, by the data processing apparatus, one or more packets containing an application message of OSI layer 5 or above, wherein the application message comprises one or more user credential elements and wherein the one or more packets containing the application message are addressed to an endpoint device other than the data processing apparatus;
determining a particular type of the application message;
identifying one or more user credential elements in the application message;
selecting, based on the policy and the particular type of the application message, a particular authentication method, and validating the application message using the one or more user credential elements and the particular authentication method;
wherein identifying the one or more user credential elements includes selecting a particular user credential location definition and performing the identifying based on the particular user credential location definition;
wherein the data processing apparatus is a router forwarding data packets below OSI layer 5.

2. The apparatus of claim 1, wherein the one or more packets comprise one or more protocol headers, and wherein a subset of the one or more user credential elements is located in the one or more protocol headers.

3. The apparatus of claim 1, wherein the application message comprises an application message header, and wherein a subset of the one or more user credential elements is located in the application message header.

4. The apparatus of claim 1, wherein the authentication and authorization logic further comprises sequences of instructions which, when executed by the one or more processors, cause the one or more processors to perform extracting an application message payload from the application message, and identifying a subset of the one or more user credential elements in the application message payload.

5. The apparatus of claim 1, wherein the authentication and authorization logic further comprises sequences of instructions which, when executed by the one or more processors, cause the one or more processors to perform forwarding an outgoing message associated with the application message to a destination.

6. The apparatus of claim 1, wherein the authentication and authorization logic further comprises sequences of instructions which, when executed by the one or more processors, cause the one or more processors to perform authenticating an identity associated with the one or more user credential elements.

7. The apparatus of claim 6, wherein the authentication and authorization logic further comprises sequences of instructions which, when executed by the one or more processors, cause the one or more processors to perform executing the particular authentication method by sending the user credential elements to an authentication service provider and requesting authentication of the user credential elements.

8. The apparatus of claim 6, wherein the authentication and authorization logic further comprises sequences of instructions which, when executed by the one or more processors, cause the one or more processors to perform authorizing one or more privileges associated with the identity.

9. The apparatus of claim 8, wherein the non-transitory computer-readable medium has stored thereon a plurality of authorization methods, wherein the policy associates the authorization methods with the respective message types, and wherein the authentication and authorization logic further comprises sequences of instructions which, when executed by the one or more processors, cause the one or more processors to perform selecting, based on the policy and the particular type of the application message, a particular authorization method, and executing the particular authorization method by sending the identity to an authorization service provider and requesting authorization of the one or more privileges associated with the identity.

10. The apparatus of claim 1, wherein the apparatus comprises any of a packet data router and a packet data switch in a packet-switched network.

11. The apparatus of claim 1, wherein the one or more stored sequences of instructions which, when executed by the one or more processors, cause the one or more processors to perform determining a particular type of the application message; enabling a user to define an association between a particular authentication method with a corresponding message type.

12. A machine-implemented method, comprising:
receiving, by a data processing apparatus, one or more packets containing an application message of OSI layer 5 or above, wherein the application message comprises one or more user credential elements and wherein the one or more packets are addressed to an endpoint device other than the data processing apparatus;
determining a particular type of the application message;
identifying one or more user credential elements in the application message;
selecting, based on a policy and the particular type of the application message, a particular authentication method, wherein the policy associates a plurality of authentication methods with respective message types; and
validating the application message using the one or more user credential elements and the particular authentication method;
wherein identifying the one or more user credential elements includes selecting a particular user credential location definition and performing the identifying based on the particular user credential location definition, and wherein the particular user credential location definition specifies locations of user credentials for various types of application messages;

wherein the data processing apparatus is a router forwarding data packets below OSI layer 5;
wherein the machine-implemented method is performed by one or more computing devices comprising at least one processor.

13. The method of claim 12, wherein the one or more packets comprise one or more protocol headers, and wherein a subset of the one or more user credential elements is located in the one or more protocol headers.

14. The method of claim 12, wherein the application message comprises an application message header, and wherein a subset of the one or more user credential elements is located in the application message header.

15. The method of claim 12, further comprising the steps of extracting an application message payload from the application message and identifying a subset of the one or more user credential elements in the application message payload.

16. The method of claim 12, further comprising the step of forwarding an outgoing message associated with the application message to a destination.

17. The method of claim 12, further comprising the step of authenticating an identity associated with the one or more user credential elements.

18. The method of claim 17, further comprising the step of executing the particular authentication method by sending the user credential elements to an authentication service provider and requesting authentication of the user credential elements.

19. The method of claim 17, further comprising the step of authorizing one or more privileges associated with the identity.

20. The method of claim 19, further comprising the steps of selecting, based on the policy and the particular type of the application message, a particular authorization method, and executing the particular authorization method by sending the identity to an authorization service provider and requesting authorization of the one or more privileges associated with the identity.

21. The method of claim 12, wherein the step of determining a particular type of the application message further comprises enabling a user to define a plurality of message types and wherein the step of selecting a particular authentication method further comprises enabling a user to define an association between a particular authentication method with a corresponding message type.

22. A computer-readable storage device carrying one or more sequences of instructions, which instructions, when executed by one or more processors, cause the one or more processors to carry out the steps of:
receiving, by a data processing apparatus, one or more packets containing an application message of OSI layer 5 or above, wherein the application message comprises one or more user credential elements and wherein the one or more packets are addressed to an endpoint device other than the data processing apparatus;
determining a particular type of the application message;
identifying one or more user credential elements in the application message;
selecting, based on the policy and the particular type of the application message, a particular authentication method; and
validating the application message using the one or more user credential elements and the particular authentication method;
wherein identifying the one or more user credential elements includes selecting a particular user credential location definition and performing the identifying based on the particular user credential location definition, and
wherein the particular user credential location definition specifies locations of user credentials for various types of application messages;
wherein the data processing apparatus is a router forwarding data packets below OSI layer 5.

23. A data processing apparatus, comprising:
a plurality of network interfaces that are coupled to a data network for receiving one or more packets therefrom and sending one or more packets thereto;
one or more processors;
a switching system coupled to the one or more processors and packet forwarding logic, wherein the switching system and packet forwarding logic are configured to receive packets on a first network interface, determine a second network interface on which to send the packets, and to send the packets on the second network interface;
a non-transitory computer-readable storage medium having stored thereon a plurality of authentication methods and a policy that associates the authentication methods with respective message types, and a plurality of user credential location definitions that specify locations of user credentials for various types of application messages;
means for receiving, by the data processing apparatus, one or more packets containing an application message of OSI layer 5 or above, wherein the application message comprises one or more user credential elements and wherein the one or more packets containing the application message are addressed to an endpoint device other than the data processing apparatus;
means for determining a particular type of the application message;
means for identifying one or more user credential elements in the application message;
means for selecting, based on the policy and the particular type of the application message, a particular authentication method; and
means for validating the application message using the one or more user credential elements and the particular authentication method;
wherein the means for identifying the one or more user credential elements includes selecting a particular user credential location definition and performing the identifying based on the particular user credential location definition;
wherein the data processing apparatus is a router forwarding data packets below OSI layer 5.

24. The apparatus of claim 23, wherein the one or more packets comprise one or more protocol headers, and wherein a subset of the one or more user credential elements is located in the one or more protocol headers.

25. The apparatus of claim 23, wherein the application message comprises an application message header, and wherein a subset of the one or more user credential elements is located in the application message header.

26. The apparatus of claim 23, further comprising means for extracting an application message payload from the application message, and means for identifying a subset of the one or more user credential elements in the application message payload.

27. The apparatus of claim 23, further comprising means for forwarding an outgoing message associated with the application message to a destination.

28. The apparatus of claim 23, further comprising means for authenticating an identity associated with the one or more user credential elements.

29. The apparatus of claim 28, further comprising means for authorizing one or more privileges associated with the identity.

30. The method of claim 23, wherein the means for determining a particular type of the application message further comprises means for enabling a user to define a plurality of message types and wherein the means for selecting a particular authentication method further comprises means for enabling a user to define an association between a particular authentication method with a corresponding message type.

* * * * *